US012709031B2

(12) United States Patent
Feng

(10) Patent No.: US 12,709,031 B2
(45) Date of Patent: Aug. 18, 2026

(54) HOUSEHOLD KNIFE WITH FINGER RING

(71) Applicant: Yangjiang Lici Technology Co., Ltd., Yangjiang (CN)

(72) Inventor: Jibiao Feng, Yangjiang (CN)

(73) Assignee: Yangjiang Lici Technology Co., Ltd., Yangjiang (CN)

( * ) Notice: Subject to any disclaimer, the term of this patent is extended or adjusted under 35 U.S.C. 154(b) by 117 days.

(21) Appl. No.: 18/403,812

(22) Filed: Jan. 4, 2024

(65) Prior Publication Data

US 2025/0010505 A1 Jan. 9, 2025

(30) Foreign Application Priority Data

Jul. 4, 2023 (CN) ......................... 202321739790.6
Aug. 29, 2023 (CN) ......................... 202322338743.7

(51) Int. Cl.
*B26B 3/00* (2006.01)

(52) U.S. Cl.
CPC ...................................... *B26B 3/00* (2013.01)

(58) Field of Classification Search
CPC ......... B26B 3/00–03; B26B 9/00; B26B 9/02; B26B 27/007
USPC ................ D7/649; D22/118; D8/99; 30/340, 30/342–344, 346.61, 351
See application file for complete search history.

(56) References Cited

U.S. PATENT DOCUMENTS 449,031 A * 3/1891 Bernard .................. B26B 29/02
30/340
472,006 A * 3/1892 Walker et al. .......... B26B 29/02
30/342
673,506 A * 5/1901 Pitts .......................... B67B 7/24
30/340
953,725 A * 4/1910 Ward ........................ B26B 3/00
D7/649
998,046 A * 7/1911 Stewart ................. B26B 27/007
30/298
D51,772 S * 2/1918 Berkshire ...................... D7/649
2,338,007 A * 12/1943 Morris ...................... B26B 9/02
30/345

(Continued)

FOREIGN PATENT DOCUMENTS

CN 20173624 2/2011
CN 107414897 A * 12/2017 .............. B26B 3/00

(Continued)

*Primary Examiner* — Jason Daniel Prone
(74) *Attorney, Agent, or Firm* — DINSMORE & SHOHL LLP

(57) ABSTRACT

A household knife with a finger ring includes: a knife body having a knife blade for cutting and a knife back arranged opposite the knife blade; a knife handle for holding, the knife handle being arranged on one side of the knife body; and a finger ring, which is arranged on one side of the knife body close to the knife handle, the finger ring having a finger hole for a finger to pass through. A minimum distance between the finger hole and the knife back is greater than or equal to a width of the knife handle part to be held by a hand. By arranging the finger ring on the knife body, the fingers can be effectively protected against cuts and fall, and a downward cutting direction of the knife blade is easily controlled, so the knife body is unlikely to deflect and roll over.

7 Claims, 9 Drawing Sheets

(56) References Cited

U.S. PATENT DOCUMENTS

| | | | | | |
|---|---|---|---|---|---|
| 2,739,498 | A | * | 3/1956 | Champlin, Jr. | B67B 7/44 30/308 |
| D224,399 | S | * | 7/1972 | Spivey | D22/118 |
| 3,890,707 | A | * | 6/1975 | Cremonese | B26B 3/00 30/340 |
| D257,056 | S | * | 9/1980 | Spivey | D22/118 |
| D262,731 | S | * | 1/1982 | Austin | D22/118 |
| D330,405 | S | * | 10/1992 | Luchak | D7/649 |
| D333,173 | S | * | 2/1993 | Pipes | D7/649 |
| D348,380 | S | * | 7/1994 | Allen | D7/649 |
| D380,520 | S | * | 7/1997 | Hibben | D22/118 |
| D403,204 | S | * | 12/1998 | Kwok | D7/649 |
| D409,270 | S | * | 5/1999 | Balolia | D22/118 |
| D424,380 | S | * | 5/2000 | McCatty | D7/649 |
| D464,551 | S | * | 10/2002 | Glesser | D22/118 |
| 6,658,743 | B2 | * | 12/2003 | Dudley, Jr. | B26B 3/00 D22/118 |
| D525,088 | S | * | 7/2006 | Fort | D7/652 |
| D539,086 | S | * | 3/2007 | Aston, III | D8/107 |
| D573,850 | S | * | 7/2008 | Curtin | D7/649 |
| 7,434,320 | B2 | * | 10/2008 | Aston, III | B26B 3/00 30/295 |
| D600,506 | S | * | 9/2009 | Miltner | D7/649 |
| D614,473 | S | * | 4/2010 | Freeman | D8/99 |
| D623,040 | S | * | 9/2010 | Freeman | D8/99 |
| D643,261 | S | * | 8/2011 | Spiegel | D7/649 |
| 8,615,888 | B2 | * | 12/2013 | Catalano | B26B 3/00 30/340 |
| D701,093 | S | * | 3/2014 | Follmer | D7/649 |
| D713,923 | S | * | 9/2014 | Salvitti | D22/118 |
| 8,839,524 | B2 | * | 9/2014 | Owens | B26B 3/00 30/340 |
| 8,992,289 | B2 | * | 3/2015 | Ramos | B26B 3/00 452/132 |
| D767,078 | S | * | 9/2016 | Hannan | D22/118 |
| D774,354 | S | * | 12/2016 | Scobey, Jr. | D7/649 |
| 9,631,892 | B1 | * | 4/2017 | Salvitti | F41B 13/08 |
| D790,290 | S | * | 6/2017 | Singer | D7/649 |
| D810,517 | S | * | 2/2018 | Singer | D7/649 |
| 9,889,573 | B2 | * | 2/2018 | Singer | B26B 3/00 |
| D816,433 | S | * | 5/2018 | Murken | D7/649 |
| D825,260 | S | * | 8/2018 | Wei | D7/649 |
| D882,352 | S | * | 4/2020 | Steenwyk | D7/649 |
| D920,073 | S | * | 5/2021 | Alexander | B26B 1/04 D8/99 |
| 11,013,866 | B2 | * | 5/2021 | Harman | B26B 3/00 |
| 11,040,459 | B2 | * | 6/2021 | Singer | B26B 3/02 |
| D931,971 | S | * | 9/2021 | Wu | D7/649 |
| D955,828 | S | * | 6/2022 | Gu | D7/649 |
| D955,829 | S | * | 6/2022 | Gu | D7/649 |
| D960,665 | S | * | 8/2022 | Gu | D7/649 |
| D964,817 | S | * | 9/2022 | Jiang | D7/649 |
| D994,427 | S | * | 8/2023 | Huang | D22/118 |
| D1,002,295 | S | * | 10/2023 | Kreiviene | D7/649 |
| D1,058,315 | S | * | 1/2025 | Jiang | D7/649 |
| D1,081,287 | S | * | 7/2025 | Zhong | D7/649 |
| D1,094,059 | S | * | 9/2025 | Feng | D8/99 |
| D1,102,239 | S | * | 11/2025 | Feng | D7/649 |
| D1,104,696 | S | * | 12/2025 | Feng | D22/118 |
| D1,108,900 | S | * | 1/2026 | Feng | D7/649 |
| D1,115,439 | S | * | 3/2026 | He | D7/649 |
| 2005/0246903 | A1 | * | 11/2005 | Yeager | B26B 3/00 30/329 |

FOREIGN PATENT DOCUMENTS

| | | | | | |
|---|---|---|---|---|---|
| CN | 218802396 | U | | 4/2023 | |
| CN | 117340940 | A | * | 1/2024 | B26B 3/00 |
| CN | 118832633 | A | * | 10/2024 | B26B 3/02 |
| KR | 20090007514 | U | * | 7/2009 | B26B 3/02 |
| KR | 20110004046 | U | * | 4/2011 | B26B 3/00 |
| SE | 7712426 | L | * | 5/1979 | B26B 3/00 |

* cited by examiner

HOUSEHOLD KNIFE WITH FINGER RING

CROSS REFERENCES TO RELATED APPLICATIONS

This application claims priority from Chinese Patent Application No. 2023217397906, filed on Jul. 4, 2023 and Chinese Patent Application No. 2023223387437, filed on Aug. 29, 2023, the entire contents of which are incorporated herein by reference in their entirety.

TECHNICAL FIELD

The present invention relates to the field of household kitchenware, and more particularly, to a household knife with a finger ring.

BACKGROUND ART

Conventional cutting kitchenware, such as a chopping knife, generally consists of a knife body and a knife handle, wherein the knife handle is assembled at the end of the knife body, and a user holds the knife handle to control a cutting action of the knife body. The user's hand-feel for the chopping knife in use mainly depends on the knife handle and a way of holding the knife handle. In a common way of holding the chopping knife, the user tightly holds around the knife handle with four fingers and applies a pressure to the knife handle with the thumb, or the user tightly grips the knife handle with four fingers and a thumb. In this way, maximum space for holding by the user is a width of the knife handle. In addition, the knife handle is usually assembled on one side of the knife body close to a knife back. Since the user's main control force of the knife body starts from the knife handle, it is easier for the user to control a part (a knife-back part) extending on one side of the knife handle in a length direction. However, because a distance between a blade part and the knife handle where the user applies a force is the farthest, the user might not be able to perform balanced control on a blade when the user makes a downward cutting action, which makes the knife body prone to rollover. Moreover, in a process of applying the force, a hole formed in a side surface of the knife body or directly formed in the knife body likely rubs against the index finger, while it is not easy to apply the force if the knife handle is directly arranged in the center on one side of the knife body. As a result, this holding way by which a holding force is mainly transferred through the handle reduces the hand feel of the chopping knife in use.

SUMMARY OF THE INVENTION

The present invention provides a household knife with a finger ring, which can effectively solve the problem that a knife body of a conventional common knife is prone to rolling over in a downward pressing process.

According to an aspect of the present invention, a household knife with a finger ring is provided. The household knife includes:

- a knife body having a knife blade for cutting, and a knife back arranged opposite the knife blade, in a width direction;
- a knife handle for holding, the knife handle being arranged on one side of the knife body; and
- a finger ring, arranged on one side of the knife body close to the knife handle, the finger ring having a finger hole for a finger to pass through, wherein

- a minimum distance between the finger hole and the knife back is greater than or equal to a width of the knife handle part to be held by a hand.

In some embodiments, a first finger groove that is recessed in a radial direction of the finger ring is formed in a circumferential outer side of the finger ring, and an opening orientation of the first finger groove changes by rotating the finger ring. Thus, the index finger grips the finger hole in use, and the rest fingers close to the knife body may fit with the first finger groove in order to improve the holding comfort.

In some embodiments, the knife body is provided with a mounting hole, and the finger ring includes:

- a sleeve, detachably mounted in the mounting hole, the finger hole being formed in the sleeve; and
- a first collar and a second collar, the first collar and the second collar being connected to two axial ends of the sleeve respectively and fitting with the knife body, wherein
- the first finger groove is formed in the first collar and the second collar. Therefore, a specific structure of the finger ring is provided, such that the finger ring can be detachably mounted on the knife body.

In some embodiments, the sleeve has a circular-arc edge, and the circular-arc edge surrounds the formed finger hole. Therefore, the circular-arc edge can increase the comfort of finger joints when the index finger grips the finger hole.

In some embodiments, projections of the finger hole and the knife blade on the knife back do not coincide with each other, and an opening of the first finger groove faces the knife blade. Therefore, a knife style of another knife body is provided, in which the knife blade does not extend underneath the finger hole, such that the first finger groove may be gripped to increase another hand holding style.

In some embodiments, the opening of the first finger groove faces an end of the knife handle, and the first finger groove is exposed on the knife body and is close to one side of the knife handle. Therefore, the first finger groove may allow another finger to abut against it, which facilitates gripping with force through the finger hole.

In some embodiments, at least one second finger groove that is recessed in an axial direction is formed in an axial end surface of the finger ring. Therefore, a side surface of a finger can fit with the second finger groove in use, thereby bringing the hand closer to the knife body, improving the holding comfort and balancing a control effect of the knife body.

In some embodiments, the first collar and the second collar are integrally formed to form an outer ring, the sleeve is provided with an elastic inner ring, the elastic inner ring is located in the outer ring, and a width of the elastic inner ring is greater than or equal to a width of the outer ring. Therefore, a contact area between the finger and the elastic inner ring and an area of extrusion on the elastic inner ring are increased, which is conducive to improving the hand feel of cutting.

In some embodiments, a projection of the finger ring coincides or partially coincides with a projection of the knife handle, in a width direction. Therefore, another knife style is provided to prevent the hand from being in direct contact with and scratched by the knife back.

In some embodiments, an abutting bevel is arranged at one end of the knife handle close to the finger ring, and a thickness of one end of the knife handle close to the knife back is greater than a thickness of the end of the knife handle close to the finger ring. Therefore, by setting a bevel wall, the finger joints fit with the finger ring more closely, which is more conducive to catering to the bending of the finger. Thus, the hand feel in use is further improved.

In some embodiments, axial end surfaces of the finger ring are provided with anti-slip dents, respectively. Therefore, the finger can be in contact with the anti-slip dents to increase the hand feel in control over the knife, thereby avoid slipping.

Compared with the prior art, the household knife with the finger ring according to the present invention has the following beneficial effects.

According to the household knife with the finger ring according to the present application, by arranging the finger ring on the knife body, the finger can be effectively protected against cuts and fall-off, and the user can control the knife body by tightly gripping the finger hole. The minimum distance between the finger hole and the knife back is greater than or equal to the width of the knife handle to be held by the hand of the user, the index finger is closest to the knife blade after gripping, and the width for the index finger to grip is equal to or greater than the width of the knife handle, which improves a control effect on the knife body and makes the hand feel in holding more comfortable. By increasing the width for the index finger to grip the finger hole, the balance of the knife body is controlled, and a downward cutting direction of the knife blade is easier to control, which makes the knife body difficult to deflect and roll over.

REFERENCE NUMERALS IN THE DRAWINGS

1—knife body, 2—knife handle, 3—finger ring, 11—mounting hole, 12—knife blade, 13—knife back, 31—first collar, 32—second collar, 33—sleeve, 331—circular-arc edge, 332—finger hole, 34—fitting surface, 35—first finger groove, 36—second finger groove, 37—third finger groove, 311—outer ring, 321—elastic inner ring, 312—clip seam, 121—abutting bevel, 133—first recess, 134—second recess, 135—bevel wall, and 111—circular hole.

DETAILED DESCRIPTION

In order to make the objectives, technical solutions and advantages of the embodiments of the present invention more clearly, the technical solutions in the embodiments of the present invention will be described clearly and completely in conjunction with the accompanying drawings in the embodiments of the present invention. Apparently, the described embodiments are merely some embodiments, rather than all embodiments, of the present invention. Based on the embodiments in the present invention, all other embodiments derived by a person of ordinary skill in the art without creative efforts shall fall within the protection scope of the present invention.

It should be noted that the terms "first" and "second" are only for the purpose of description and should not be construed as indicating or implying relative importance or implicitly indicating the number of technical features indicated. Thus, the features defined by the terms "first" and "second" may include at least one feature explicitly or implicitly. In the descriptions of the present invention, unless otherwise specifically limited, the term "plurality" means at least two, for example two, three, etc.

The present invention relates to a household knife with a finger ring, which is particularly suitable for being used as common kitchen knives, like a novel knife that can replace the traditional chopping knife, and has the advantages of improving the hand feel in use and being more convenient to hold. Of course, the structure of this knife is not limited to chopping knives in the kitchenware field, but also suitable for other knives that can be held in hand.

The present invention will be further explained below in conjunction with the accompanying drawings.

Embodiment 1

Figure 1:
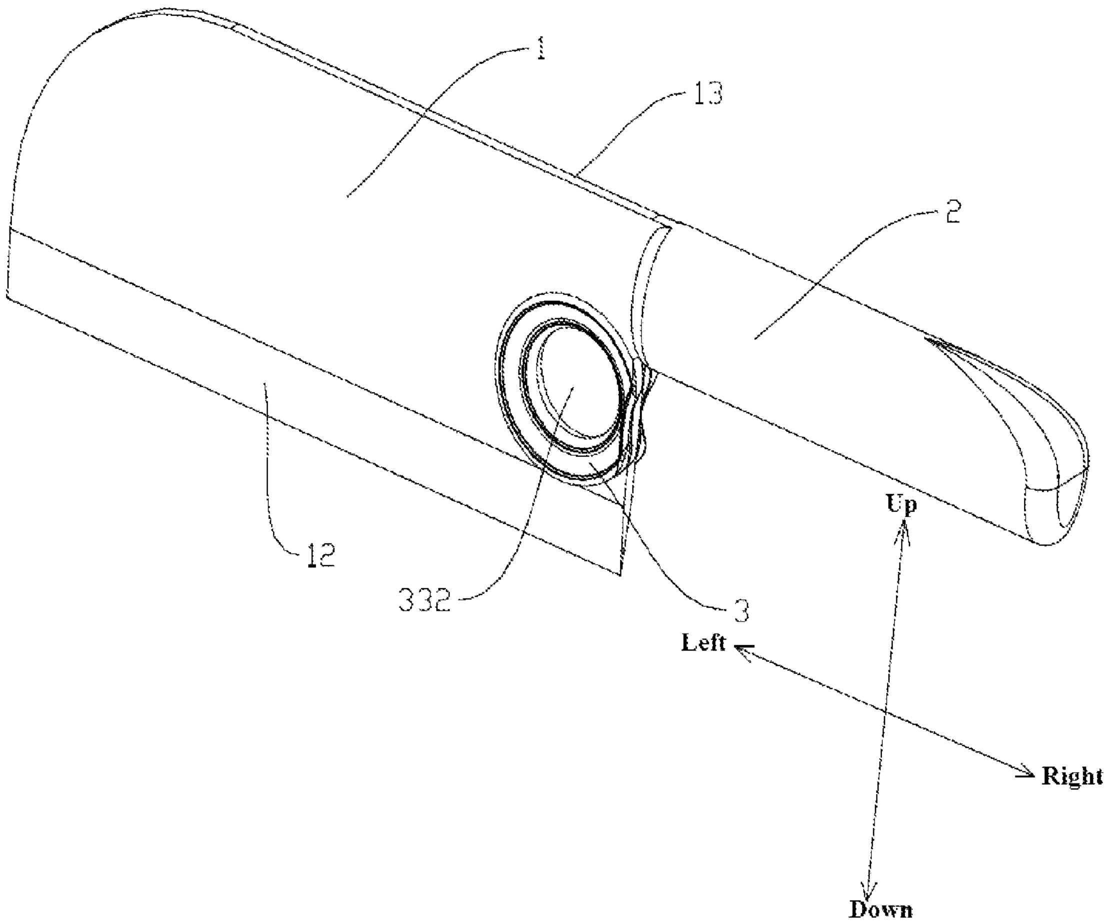
FIG. 1 is a three-dimensional diagram of a household knife with a finger ring in Embodiment 1.

FIG. 1 schematically shows a household knife (hereinafter referred to as "knife") with a finger ring according to an implementation of the present invention. As shown in FIG. 1, for convenience of description, a length direction of this knife is a left-right direction, and a width direction of this knife is an up-down direction. This knife includes a knife body 1 and a knife handle 2.

Figure 2:
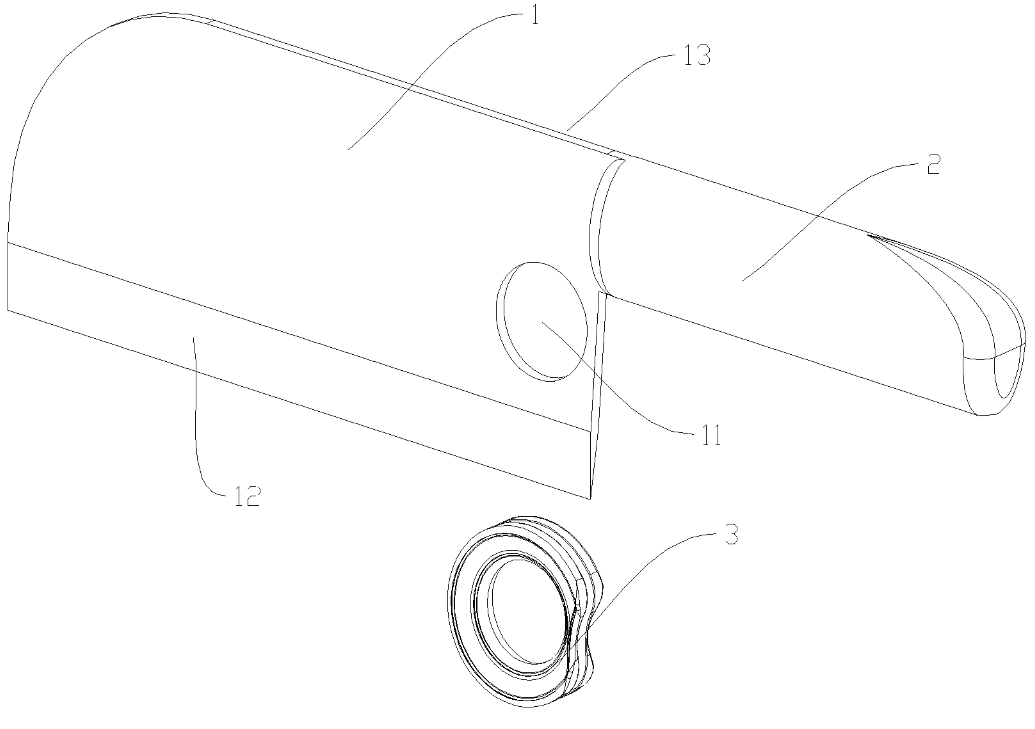
FIG. 2 is a structural exploded view of FIG. 1.

As shown in FIG. 2, this knife has a shape similar to that of the common chopping knife, that is, the knife body 1 includes a knife back 13 and a knife blade 12. The specific appearance and shape of the knife body 1 are not limited, and may be set according to the actual use. The knife back 13 and the knife blade 12 are arranged opposite each other in the width direction, the knife back 13 is located on the upper side of the knife body 1 and has a thickness corresponding to the knife body 1, and the knife blade 12 is located on the lower side of the knife body 1 and is capable of cutting food. The knife handle 2 serves as a component that can be held by a user's hand and is arranged on one side (right side) in a length direction of the knife body 1. The combination of the knife body 1 and the knife handle 2 may refer to the existing design. In this embodiment, the knife handle 2 adopts a flat columnar body structure, and the knife handle 2 is located on the upper side of the knife body 1 and is flush with the knife back 13 in the width direction.

Figure 4:
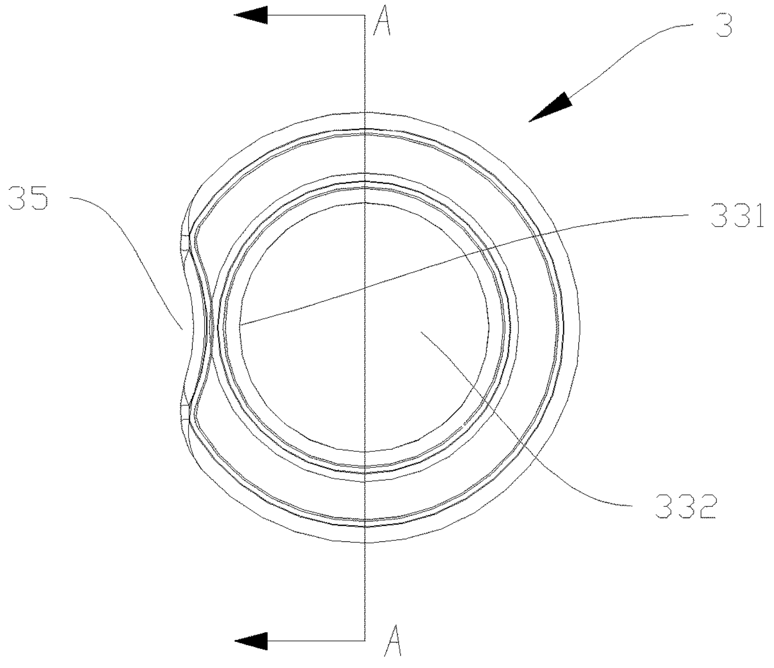
FIG. 4 is a schematic diagram of an axial end surface of the finger ring in Embodiment 1.

As shown in FIG. 4, the finger ring 3 is arranged on the knife body 1, and the finger ring 3 has a shape of a regular annular structure, and is located on one side close to the knife handle 2, that is, on the right side of the knife body 1. In addition, the finger ring 3 has a penetrated finger hole 332, and a user's finger can pass through the finger hole 332 in use for the finger to hold tightly. Specifically, the knife body 1 is provided with a mounting hole 11, which is a through hole in the knife body 1 and is used for providing a mounting position for the finger ring 3. The finger ring 3 is detachably mounted in the mounting hole 11. The finger ring 3 may be inlaid on the knife body 1 by means of clamping or other mounting methods. Since the finger ring 3 is positionally close to the handle, the finger of the user can pass through the finger hole 332 when the user holds the handle in use, so as to grip and control the knife. For example, the index finger may pass through the finger hole 332 and bend and grip, and the remaining four fingers all grip the handle, such that a force applied by the index finger of the user is controlled to the knife body 1, and the force exerted by the remaining four fingers is transferred to the knife body 1 from the knife handle 2. In this embodiment, the knife back 13 has a length corresponding to the length of the knife blade 12, and the finger hole 332 penetrates through the knife body 1 and is located between the blade back 13 and the knife blade 12. That is, a part of the knife blade 12 is located on the lower side of the finger ring 3 and used for cutting.

Figure 3:
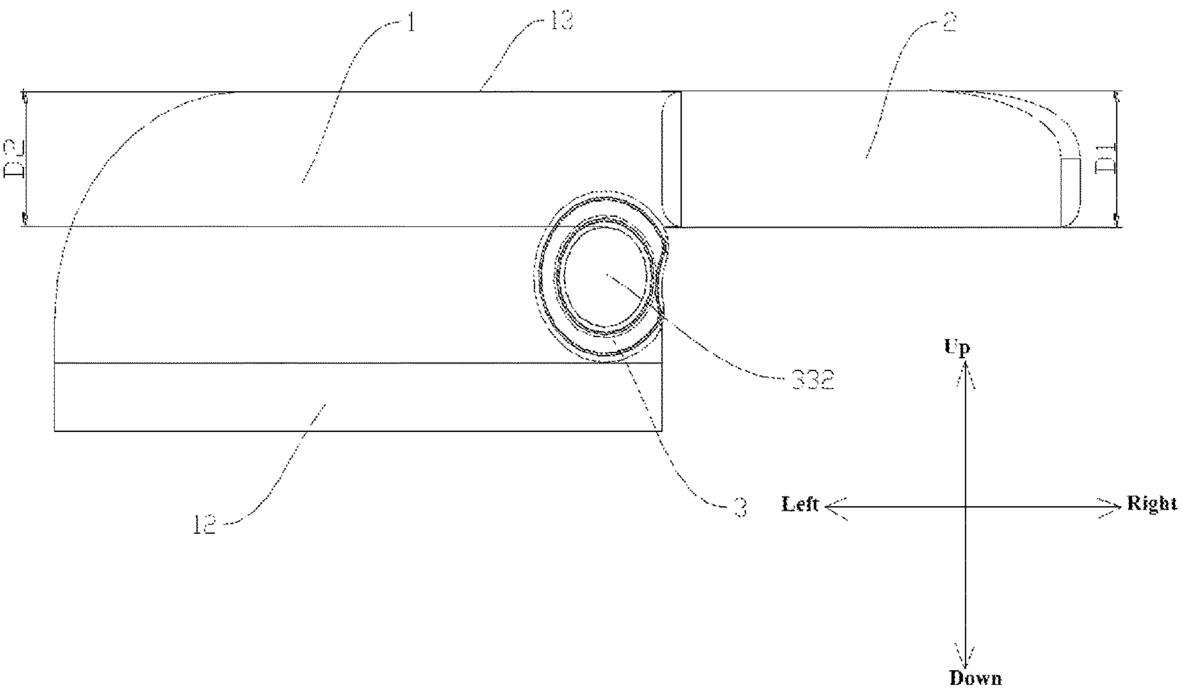
FIG. 3 is a main view of the household knife with the finger ring in Embodiment 1.

In order to improve the user's hand feel in use, the knife changes the traditional hand holding mode, and changes a way of controlling a force applied to the knife body 1. As shown in FIG. 3, the minimum distance between the finger hole 332 and the knife back 13 is set to be greater than or equal to the maximum distance between the knife handle 2 and the knife back 13, such that the user's index finger is positionally closer to the knife blade 12. In addition, the index finger exerts a force on the knife body 1, such that a holding angle of the user's index finger is increased, thereby increasing the hand feel in controlling the knife body 1. Therefore, the control direction of the knife blade 12 is more balanced, and it is difficult to deflect from knife surfaces on two sides of the knife body 1. Specifically, the handle exerts a force on the knife body 1 to control a downward cutting direction of the knife blade 12. In the width direction, a distance that the width of the knife handle 2 extends from the left side to the knife body 1 may be recorded as an equivalent distance D. and the force applied by the handle has an optimal effect on the downward cutting control for the structure within the equivalent distance D (similar to a control direction of a long stick). In this embodiment, the knife back 13 is flush with the knife handle 2. That is, in the width direction, a maximum distance between the lower side of the knife handle 2 and the knife back 13 is the equivalent distance D1 (i.e., a width of the knife handle part to be hand-held by the user), and the equivalent distance D1 is an optimal distance in which a force is applied through the handle. The user's index finger passes through the finger hole 332 to exert a force on the knife body 1, that is, in the width direction, the minimum distance between the finger hole 332 and the knife back 13 is an equivalent distance D2. Due to the width of the index finger itself, the equivalent distance D2 is larger in actual use. In this embodiment, the equivalent distance D2 is greater than or equal to the equivalent distance D1. Because the user's four fingers grip the handle to exert a force, the index finger passes through the finger hole 332 and can directly exert a force to the knife body 1, and the index finger is closer to the knife blade 12 than the other four fingers, so the control of the downward cutting direction of the knife blade 12 is easier, and it is difficult to deflect.

In addition, the finger ring 3 is directly mounted in the mounting hole 11 of the knife body 1, the finger ring 3 closes the inner wall of the mounting hole 11, and is not in contact with the inner wall of the mounting hole 11 when tightly gripped with the index finger, such that the index finger is protected more comprehensively when the index finger applies the force, without scratching the index finger.

Figure 5:
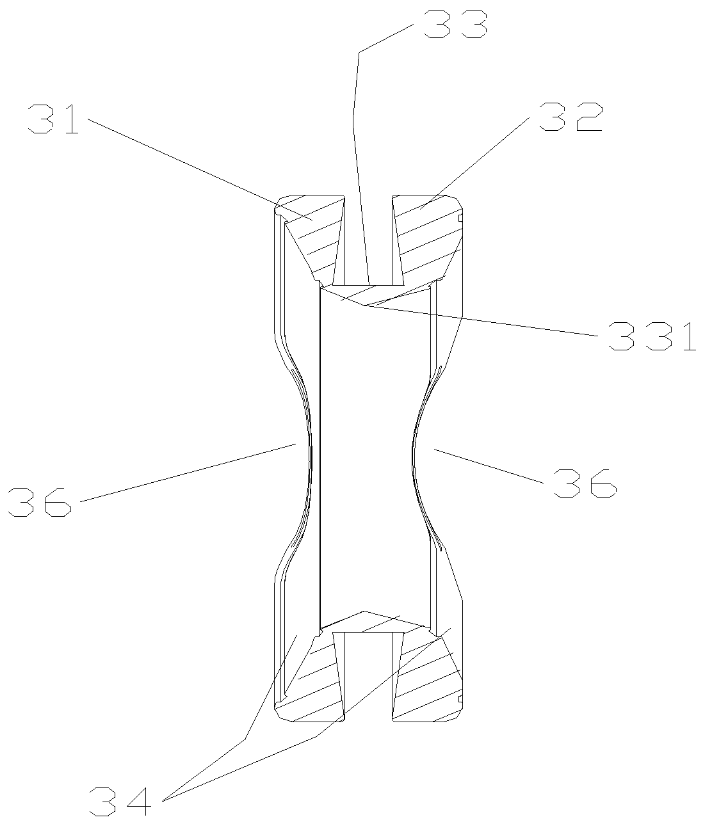
FIG. 5 is a sectional view taken along a line A-A in FIG. 4.

Further, as shown in FIG. 5, the finger ring 3 includes a sleeve 33, a first collar 31 and a second collar 32, wherein the sleeve 33 is detachably mounted in the mounting hole 11, and the finger hole 332 is formed in the sleeve 33. The sleeve 33 is of a cylindrical structure, and the first collar 31 and the second collar 32 are both of an annular structure. The insides of the first collar 31 and the second collar 32 can be connected to the circumferential outer side of the sleeve 33. By means of clamping, the first collar 31 is connected to one axial end of the sleeve 33, and the second collar 32 is connected to the other axial end of the sleeve 33. There is a spacing between the first collar 31 and the second collar, such that the end surfaces of the first collar 31 and the second collar 32 are fit to the knife surfaces of the knife body 1. The sleeve 33 has a circular-arc edge 331. That is, the inner wall of the sleeve 33 is surrounded by the circular-arc edge 331 to form the finger hole 332. When the user's index finger grips the finger hole 332, the circular-arc edge 331 can improve the comfort of the finger joints. The finger ring 3 may be made of a plastic material.

Figure 6:
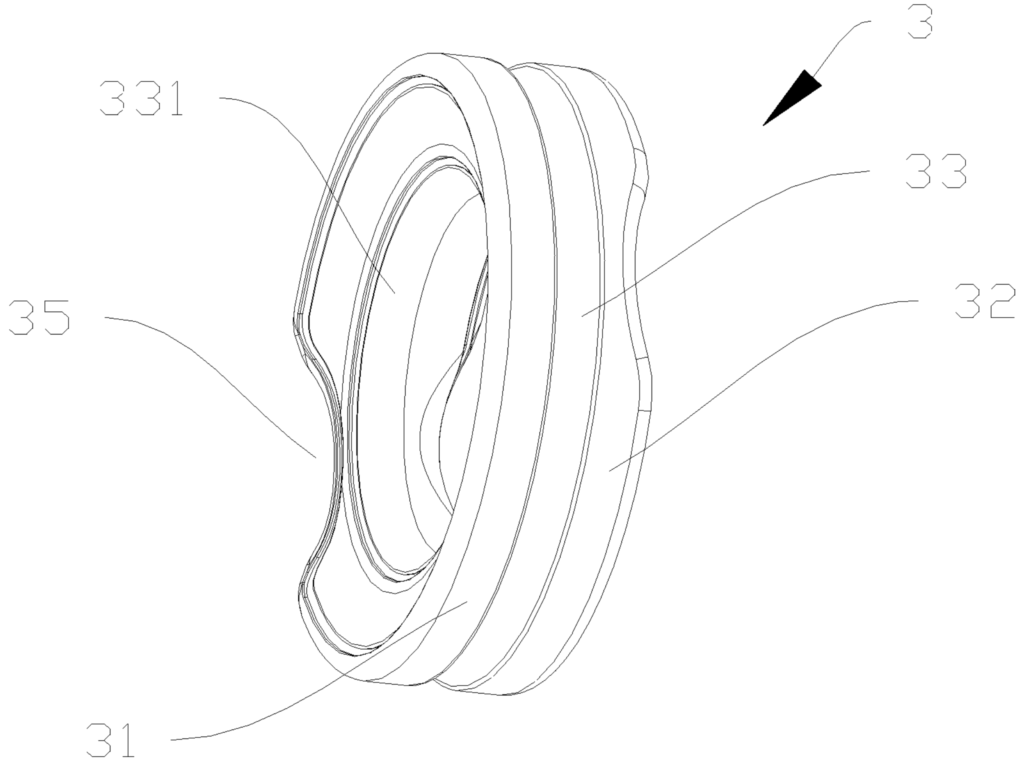
FIG. 6 is a three-dimensional diagram of the finger ring in Embodiment 1.

As shown in FIG. 6, a first finger groove 35 that is recessed in a radial direction of the finger ring is formed in the circumferential outer side of the finger ring 3. Specifically, the first finger groove 35 is formed in the first collar 31 and the second collar 32, and the first finger groove 35 is of a groove structure with a circular-arc structure, and has a shape adapted to the side surfaces of the user's finger. When an opening of the first finger groove 35 faces the knife handle 2, and the finger ring 3 is mounted on the knife body 1, the right side of the finger ring 3 protrudes from the right end surface of the knife body 1, such that the first finger groove 35 is closer to the handle than the right end surface of the knife body 1. When in use, the user's index finger grips the finger hole 332, and the remaining four fingers grip the handle, such that the finger (middle finger) close to the right end surface of the knife body 1 can be fit with the first finger groove 35. Therefore, through the first finger groove 35, the user's finger is isolated from the right end surface of the knife body 1, such that the problem that the end surface of the knife body 1 can scratch the fingers when the user uses the knife for a long time is avoided, and the hand feel of the holding of the user can be further improved. In addition, an opening orientation of the first finger groove 35 may also be changed by rotating the finger ring 3, so as to adjust an angle at which the finger abuts against the first finger groove 35, and adapt to the gripping gestures of different groups of people.

Figure 7:
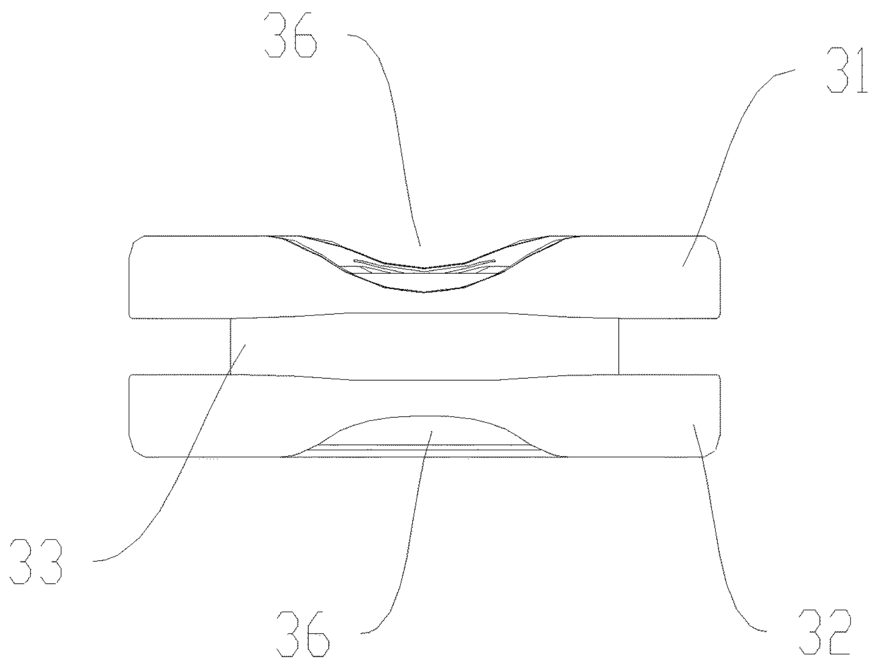
FIG. 7 is a schematic diagram of the finger ring viewed in a radial direction in Embodiment 1.

As shown in FIG. 7, the axial end surface of the finger ring 3 is provided with at least one second finger groove 36 that is recessed in an axial direction. The second finger groove 36 is of a groove structure, and is formed in the axial end surface of the finger ring 3. That is, the second finger groove 36 which is recessed in the axial direction is formed in the end surfaces of the first collar 31 and the second collar 32. The second finger groove 36 is preferably a groove with a circular-arc structure, and can be fit with the user's finger in use. Two second finger grooves 36 may be arranged opposite each other in the radial direction of the finger ring 3. In this embodiment, the second finger grooves 36 are arranged along the length direction of the knife, and the finger can fit with the second finger groove 36, such that the hand is closer to the knife body 1, thereby improving the gripping hand feel and the comfort in use.

In some embodiments, as shown in FIG. 5, the first collar 31 and the second collar 32 are respectively provided with a fitting surface 34 which may be a bevel or may be of an inclined curved surface structure. The fitting surfaces 34 are inclined planes at the axial ends of the first collar 31 and the second collar 32. In addition, the two fitting surfaces 34 extend in a direction close to the sleeve 33, such that the circular-arc edge 331 of the sleeve 33 is connected between the fitting surfaces 34. An axial width of the sleeve 33 is less than an axial width of the finger ring. When in use, the index finger grips the finger hole 332, and the two fitting surfaces 34 can fit to a first knuckle and a second knuckle in the index finger respectively, thereby improving the comfort, and facilitating control of the knife body 1.

Figure 8:
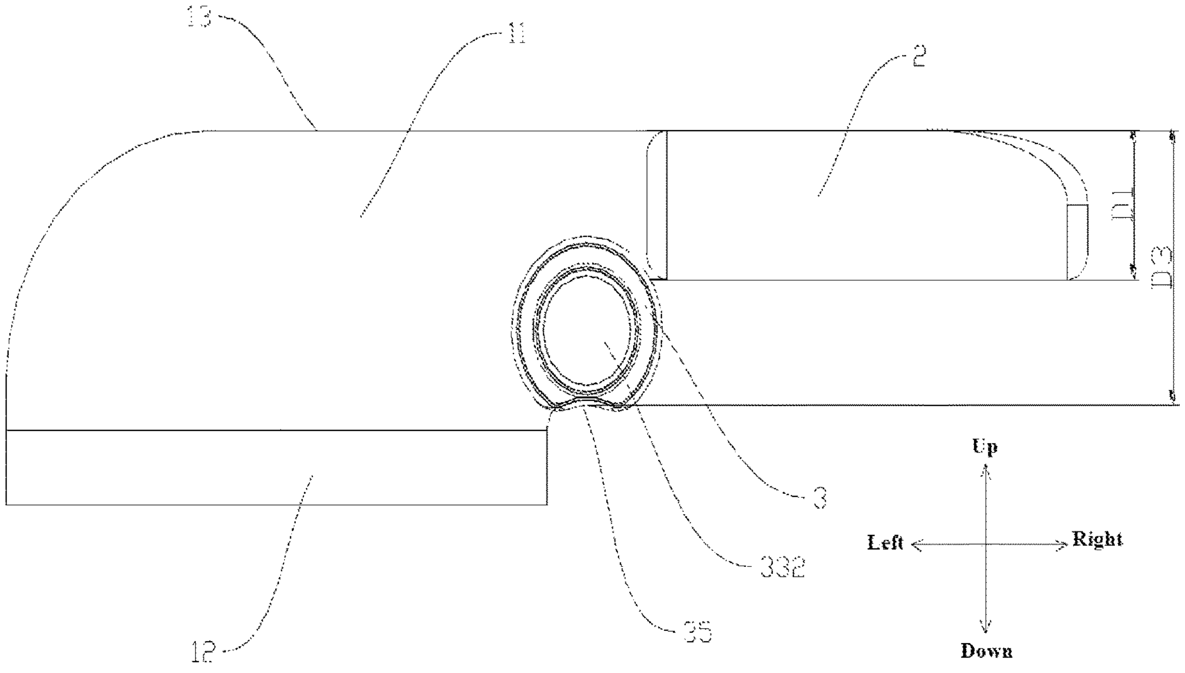
FIG. 8 is a schematic diagram of another implementation of the household knife with the finger ring in Embodiment 1.

In some embodiments, as shown in FIG. 8, a knife style of another knife body 1 is provided, wherein the length of the knife back 13 is designed not to correspond to the length of the knife blade 12. In this embodiment, the length of the knife blade 12 does not extend underneath the finger ring 3, and preferably there is no part of the knife blade 12 underneath the finger hole 332, that is, the finger hole 332 and the knife blade 12 do not coincide in the width direction. The projections of the finger hole 332 and the knife blade 12 on the knife back 13 do not overlap, in this case, the lower right side of the knife body 1 is of an opening structure, and the finger ring 3 may be entirely clamped on the edge of the opening, or the finger ring 3 is rotated and adjusted through the cooperation with the mounting hole 11. In this embodiment, the opening of the first finger groove 35 faces the knife blade 12, that is, faces the lower side of the knife body 1. An equivalent distance D3 between the first finger groove 35 and the knife back 13 is the largest in the width direction, so the user can still grip the finger hole 332 with the index finger, or grip the first finger groove 35 closer to the part of the knife edge 12. Therefore, the above structure provides two holding ways to adapt to different users and improve the holding comfort.

Figure 9:
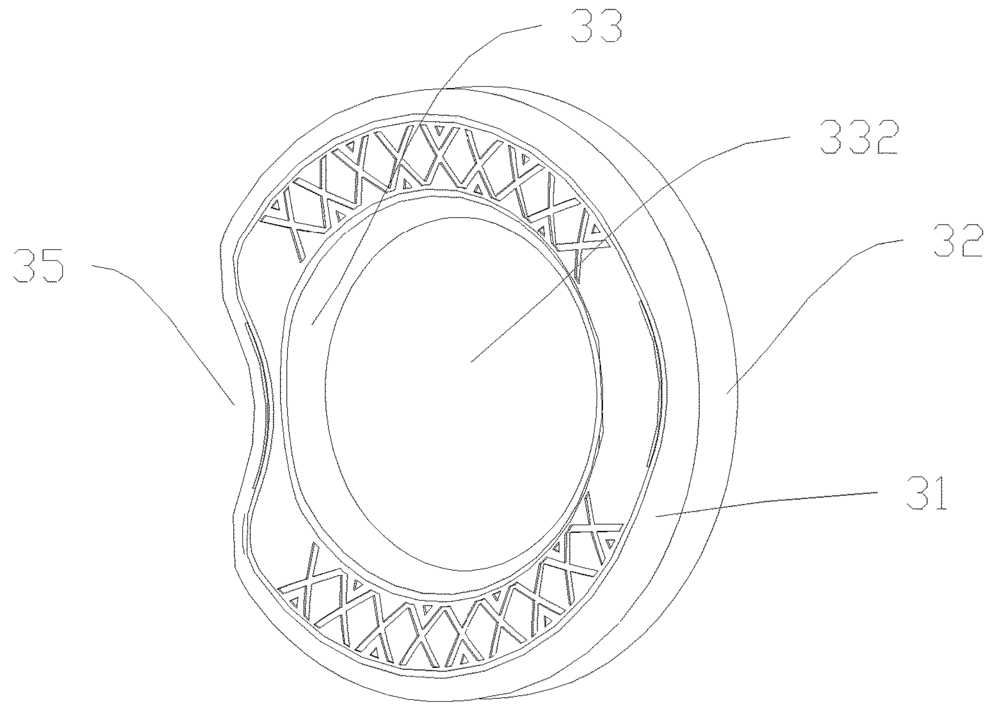
FIG. 9 is a three-dimensional diagram of the finger ring with dents in Embodiment 1.
Figure 10:
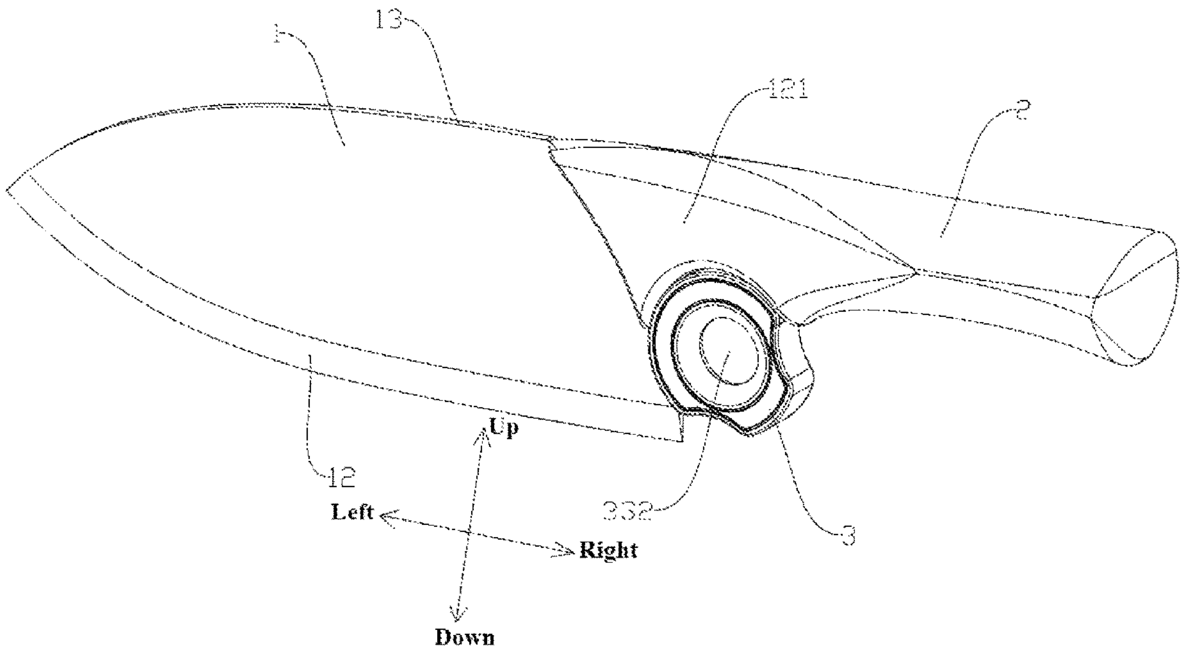
FIG. 10 is a schematic structural diagram of a household knife with a finger ring in Embodiment 2.

In some embodiments, as shown in FIG. 9, a plurality of grooves which has regular shapes and is evenly arranged is formed in the axial end surface of the finger ring 3. The anti-slip dents for holding are formed around the finger ring 3, e.g., arranged on the fitting surfaces 34, and are fit with the joints of the index finger in use, such that a gripping effect is improved, thereby improving the comfort of the index finger in a holding way in which the index finger fits with the knife body 1. The evenly arranged grooves are matched with the finger to increase a spatial contact area of the finger in the transition from the thicker knife handle 2 to the thinner knife body 1, thereby improving the holding comfort.

It can be seen that when the equivalent distance D on the knife body 1 is larger when the knife according to the present application is held, the knife body 1 can be controlled more conveniently, such that the knife body 1 is difficult to deflect in a process of pressing down and cutting, thereby improving the comfort and the controllability. In addition, the finger ring 3 can protect the finger from cuts and falling off, providing a holding mode with a greater gripping force and facilitating the application of force. The finger ring 3 conforms to the radian of the finger, which is convenient for the index finger to place and grip more comfortably, and is conducive to improving the hand feel in use.

Embodiment 2

As shown in FIGS. 10 to 14, a knife structure of this embodiment is mostly the same as that of Embodiment 1, except that the structural design of the finger ring 3 and the structure of the knife body are improved. The details are as follows.

Figure 11:
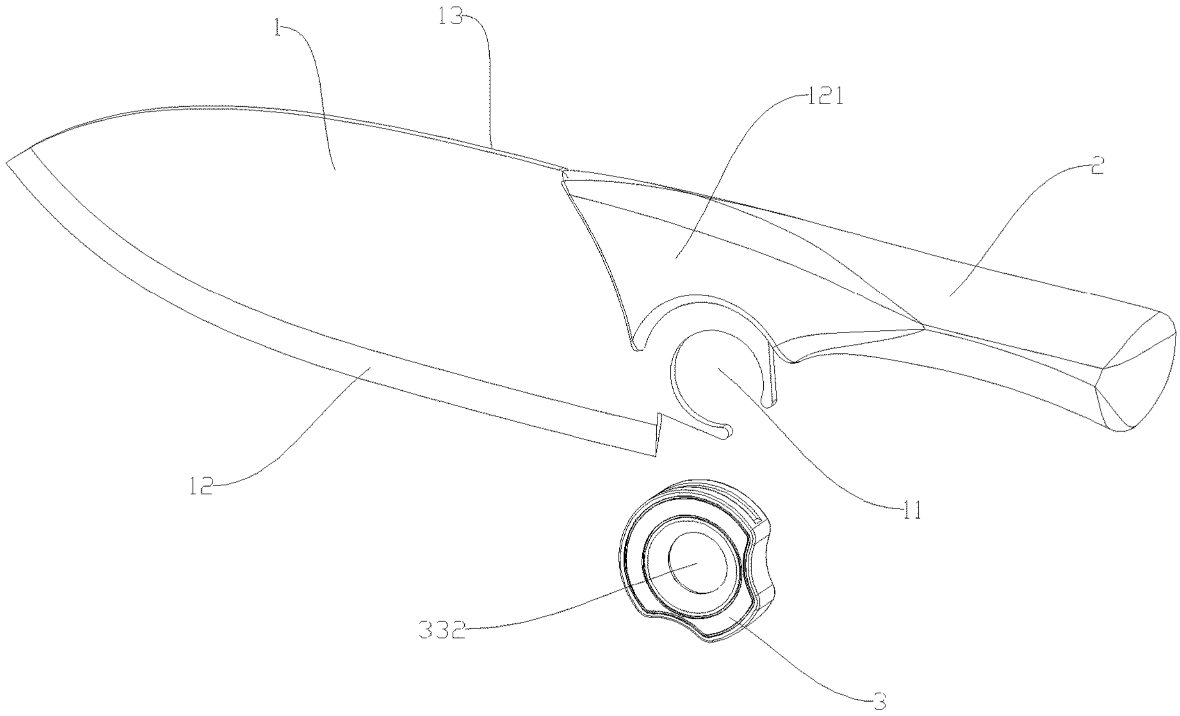
FIG. 11 is a structural exploded view of the household knife with the finger ring in Embodiment 2.

As shown in FIG. 11, a mounting hole 11 is formed in one side of the knife body 1 close to the knife handle 2. Specifically, the mounting hole 11 is positionally closer to the right end surface of the knife body 1. In addition, the mounting hole 11 adopts an open-type structure, that is, the mounting hole 11 is of a C-shaped opening structure, such that the finger ring 3 can be detachably connected into the mounting hole 11. The structure of the mounting hole 11 is conducive to deformation to adjust the clamping strength with the finger ring 3.

Figure 13:
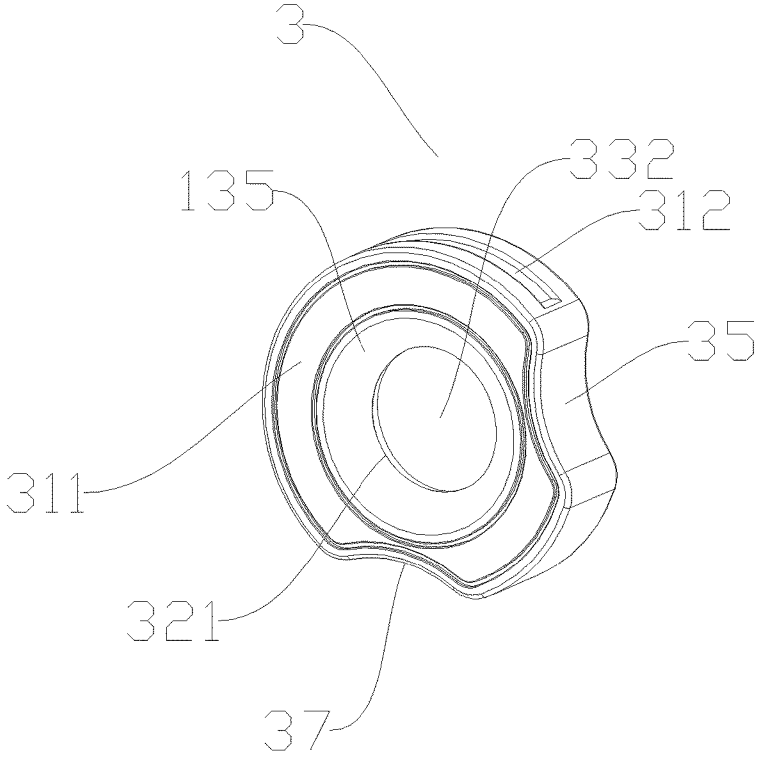
FIG. 13 is a schematic structural diagram of the finger ring in Embodiment 2.

As shown in FIG. 13, the finger ring 3 includes an outer ring 311 and an elastic inner ring 321. In this embodiment, the first collar 31 and the second collar 32 of the finger ring 3 are integrally designed to form the outer ring 311, and the outer ring 311 and the sleeve 33 may be integrally formed. The sleeve 33 is provided with the elastic inner ring 321 that is formed from an elastic material such as rubber or a silicone material. Therefore, the outer ring 311 serves as an external structure of the finger ring 3, the elastic inner ring 321 serves as an internal structure abutting against the finger, the outer ring 311 is clamped in the mounting hole 11 through the sleeve 33, and the finger hole 332 is a central hole of the elastic inner ring 321. The width of the elastic inner ring 321 is greater than or equal to the width of the outer ring 311, such that the user's index finger can be in contact with the elastic inner ring 321 in a larger area, thereby improving the comfort in use. After the index finger bends to squeeze the elastic inner ring 321, the joint wear to the index finger is relatively small even if the index finger strongly grips the elastic inner ring. The width of the elastic inner ring 321 is larger than that of the outer ring 311, so as to increase the contact area between the index finger and the elastic inner ring 321.

It should be noted that a clip seam 312 is formed in the middle of the outer ring 311, and used for providing a necessary space for the outer ring 311 to abut against the knife body 1. In addition, different from Embodiment 1, the clip seam 312 is not of a continuous structure on the outer ring 311, but only retains one end that fits with the knife body 1, such that the clip seam 312 is not exposed to the outer side of the knife body. Thus, other debris difficult to clean is prevented from entering the clip seam 312, avoiding bad influence on the normal use of the finger ring 3.

Further, in order to fit the finger hole 332 with the index finger as close as possible in use, so as to reduce a distance or gap between the finger hole 332 and the index finger, the diameter of the finger hole 332 is set to 13-22 mm. Preferably, the diameter of the finger hole 332 is 15 mm, that is, the diameter of the finger hole 332 is equal to or slightly less than (close to) the width of the adult's index finger, which is more suitable for use of an adult. The index finger can be wrapped by the elastic inner ring 321 as much as possible in the finger hole 332, and the elastic inner ring 321 has elastic properties. The elastic inner ring 321 can exert a tightening force (binding force) on the index finger along its radial direction. Of course, the finger ring 3 may be set in a variety of styles to conform to the finger width of each group of people. This embodiment is described by taking an example which adapts for and is close to the normal finger width of an adult. Therefore, when the user uses the knife to cut along the length direction or cut down along the width direction, a part of the index finger can fit into the finger hole 332 without strongly gripping the finger ring 3, which is mainly used for adjusting a deflection amplitude around the knife blade 12 in the course of cutting transversely or pressing down for cutting. In addition, the force is mainly applied through the hand-held handle, that is, the cutting hand feel in use is adjusted through the index finger. When a user increases a force of slash, the finger hole 332 fit with the index finger can also play a cushioning role, thereby avoiding reduced balance caused by vibration during cutting.

Similarly, as shown in FIG. 13, a first finger groove 35 is also formed in the outer side surface of the finger ring 3, and an opening of the first finger groove 35 faces the end of the knife handle 2. Specifically, the first finger groove 35 is formed in the outer side surface of the outer ring 311, and is of a groove structure having a circular-arc shape, except that the first finger groove 35 is connected to the clip seam 312. The first finger groove 35 is of a closed structure, and is used for sealing the continuity of the clip seam 312 to enable the first finger groove 35 to be exposed to the outside of the knife. Therefore, a distance between the concave bottom end of the first finger groove 35 and the elastic inner ring 321 is less than the width of the outer ring 311, and the finger of the user close to a side surface (right side) of the knife body 1 can abut against the first finger groove 35 in use, thereby preventing the finger from slipping out and detaching in the course of cutting down or pressing down.

In some embodiments, a third finger groove 37 is formed in the outer side surface of the finger ring 3, which is similar to the first finger groove 35. The third finger groove 37 is formed in the outer surface of the outer ring 311, and has an opening facing one side (lower side) of the knife blade 12. In a width direction, a distance between the third finger groove 37 and the knife back 13 is greater than a distance between the finger hole 332 and the knife back 13. It can be seen that the index finger may grip the finger hole 332, or abut against the third finger groove 37 in order to change the distance between the index finger and the knife back 13. The index finger is closer to the knife blade 12, thereby increasing the diversity of holding gestures of the finger ring 3. In addition, due to the difference in structure of the finger ring 3 in this embodiment, the finger ring 3 does not adapt to adjusting by rotating, so the third finger groove 37 facilitates providing another angle for the finger ring 3 to abut against the finger. In the width direction, the projections of the third finger groove 37 and the knife blade 12 do not coincide with each other, that is, the part of the knife blade 12 does not extend to the lower side of the third finger groove 37, so as to avoid scratching the index finger.

Figure 12:
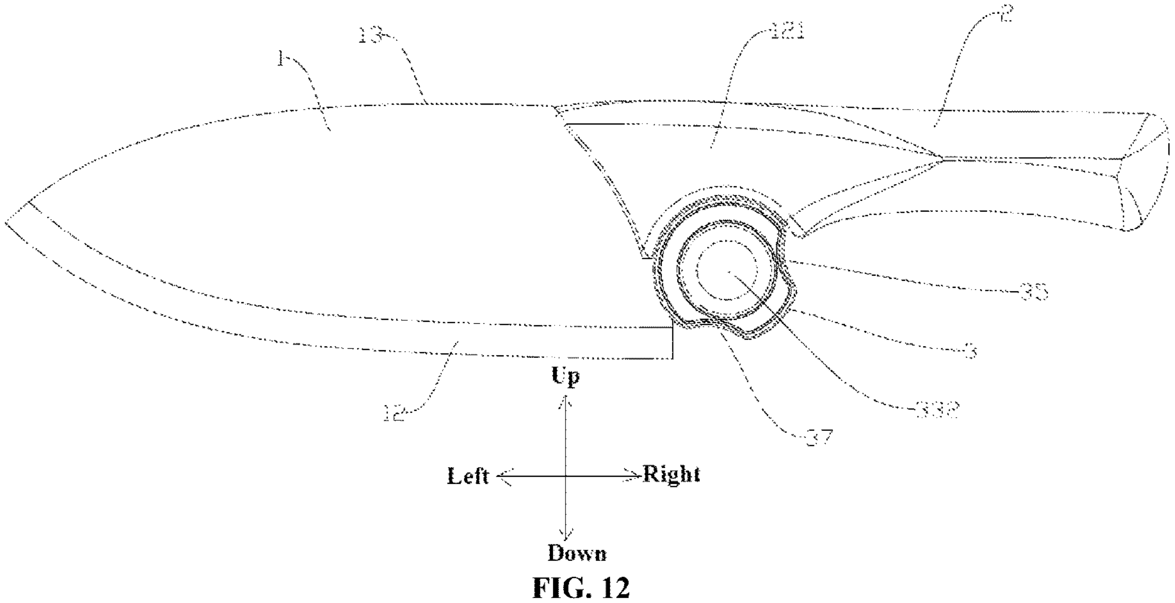
FIG. 12 is a main view of the household knife with the finger ring in Embodiment 2.

In some embodiments, as shown in FIG. 12, in the width direction, the projection of the finger ring 3 coincides or partially coincides with the projection of the knife handle 2. In this embodiment, the knife handle 2 extends to the knife back 13 in the length direction, that is, the finger ring 3 is located on the lower side of the knife handle 2. Projections of the finger ring 3 and a part of the knife handle 2 close to one side (left side) of the knife body 1 in the width direction coincide with each other, such that the user is protected from being in contact with the knife body 1 while holding the knife handle 2 in use, thereby improving the holding hand feel and protecting the hand. Further, an abutting bevel 121 is arranged at one end of the knife handle 2 close to the finger ring 3, namely, on the left side of the knife handle 2. The thickness of one side of the knife handle 2 where the abutting bevel 121 is close to the knife handle 2 is less than the thickness of the upper side (close to one side of the knife back) of the knife handle 2. Preferably, the knife handle 2 is of a flat cylindrical structure. Therefore, when the handle is held, the index finger part can be abutted against the abutting bevel 121 to cater to the most suitable holding posture.

In some embodiments, as shown in FIG. 13, the finger ring 3 is provided with a bevel wall 135 surrounding the finger hole 332, and the bevel wall 135 is connected to the finger hole 332. Specifically, the bevel wall 135 is arranged on the edge of the elastic inner ring 321 to cater to the posture of the bent index finger joint, thereby improving the holding comfort.

In some embodiments, the end surface of the finger ring 3 is provided with anti-slip dents, that is, the anti-slip dents are arranged on the end surface of the outer ring 311. The anti-slip dents are regularly arranged around the elastic inner ring 321, such that the friction force of contact is increased when the index finger part abuts against the outer ring 311, thereby avoiding slipping.

Figure 14:
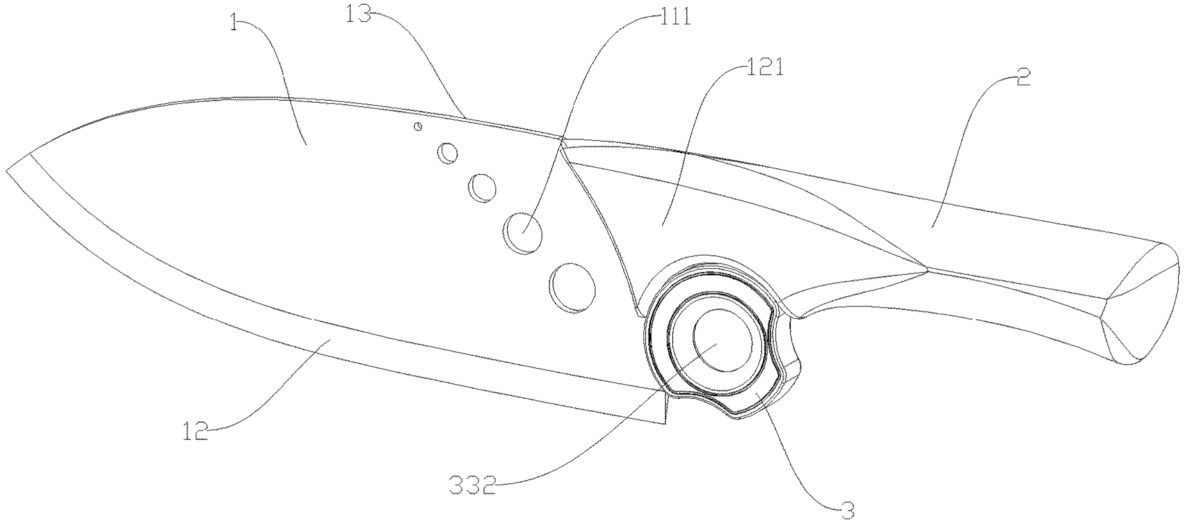
FIG. 14 is a schematic structural diagram of another implementation structure of the household knife with the finger ring in Embodiment 2.

In some embodiments, as shown in FIG. 14, the knife body 1 is provided with a plurality of penetrated circular holes 111. The circular holes 111 are formed obliquely in the width direction. The plurality of round holes 111 has different sizes, which is convenient for hanging of the knife body 1 on a shelf and can reduce the weight of the knife body 1.

The above only describes preferred embodiments of the present invention. For the sake of brevity, not all possible combinations of various technical features in the above embodiments are described, nor limiting the present invention in any form. Therefore, any amendments, equivalent changes and modifications made to the above embodiments according to the technical essence of the present invention without departing from the content of the technical solutions of the present invention are still within the scope of the technical solutions of the present invention.

What is claimed is:

1. A household knife, comprising:

a knife body, the knife body having a knife blade for cutting, and a knife back arranged opposite the knife blade, the knife body defining a width direction from the knife blade to the knife back, a length direction orthogonal to the width direction, and having a distal end and a proximal end in the length direction;

a knife handle for holding, the knife handle being arranged on the proximal end of the knife body; and a finger ring being arranged on the knife body closer to the proximal end of the knife blade than the distal end of the blade, the finger ring having a finger hole for a finger to pass through, wherein:

a minimum distance between the finger hole and the knife back is greater than or equal to a width in the width direction of the knife handle, a direction starting at a center of the finger hole and extending outward to a circumference of the finger ring is defined as a radial direction, a first finger groove that is recessed in the radial direction of the finger ring is formed in a circumferential outer side of the finger ring, and the knife body is provided with a mounting hole, and the finger ring comprises:

a sleeve detachably mounted in the mounting hole, the finger hole being formed in the sleeve; and a first collar and a second collar, the first collar and the second collar being connected to two axial ends of the sleeve respectively and being fit with the knife body, the first finger groove being formed in the first collar and the second collar.

2. The household knife according to claim 1, wherein an opening orientation of the first finger groove changes by rotating the finger ring.

3. The household knife according to claim 2, wherein when the opening of the first finger groove faces an end of the knife handle, the first finger groove is exposed on the knife body and is closer to the proximal end of the knife body than the distal end of the knife body.

4. The household knife according to claim 1, wherein the sleeve has a circular-arc edge, and the finger hole is formed around the circular-arc edge.

5. The household knife according to claim 1, wherein a direction orthogonal to the radial direction of the finger ring is defined as axial direction, and at least one second finger groove that is recessed in the axial direction is formed in an axial end surface of the finger ring.

6. The household knife according to claim 1, wherein the first collar and the second collar are integrally formed to form an outer ring, the sleeve is provided with an elastic inner ring, the elastic inner ring is located in the outer ring, and a width of the elastic inner ring is greater than or equal to a width of the outer ring.

7. The household knife according to claim 1, wherein an axial end surface of the finger ring is provided with anti-slip dents.

* * * * *